US012692888B2

(12) United States Patent (10) Patent No.: US 12,692,888 B2
Pao (45) Date of Patent: Jul. 28, 2026

(54) TELESCOPIC TUBE DEVICE

(71) Applicant: STEP2GOLD CO., LTD., Taichung City (TW)

(72) Inventor: Chih-Ting Pao, Taichung City (TW)

(73) Assignee: Step2Gold Co., Ltd., Taichung City (TW)

( * ) Notice: Subject to any disclaimer, the term of this patent is extended or adjusted under 35 U.S.C. 154(b) by 219 days.

(21) Appl. No.: 18/779,440

(22) Filed: Jul. 22, 2024

(65) Prior Publication Data

US 2026/0022725 A1     Jan. 22, 2026

(51) Int. Cl.
F16B 7/10          (2006.01)
(52) U.S. Cl.
CPC .................................... F16B 7/105 (2013.01)
(58) Field of Classification Search
CPC ....................................................... F16B 7/105
USPC ........................................... 403/109.6, 109.3
See application file for complete search history.

(56) References Cited

U.S. PATENT DOCUMENTS

| | | | | |
|---|---|---|---|---|
| 7,293,934 B1 * | 11/2007 | Huang | .................... | F16B 7/105 |
| | | | | 403/379.5 |
| 7,441,733 B2 * | 10/2008 | Chen | ....................... | F16B 7/105 |
| | | | | 297/256.16 |
| 7,581,288 B2 * | 9/2009 | Zhang | ..................... | A47L 9/244 |
| | | | | 403/109.2 |
| 8,683,657 B2 * | 4/2014 | Lin | .......................... | B25G 1/04 |
| | | | | 16/429 |
| 9,248,072 B2 * | 2/2016 | Wu | ........................... | F16B 7/14 |
| 12,398,742 B1 * | 8/2025 | Li | ........................... | F16B 7/105 |

* cited by examiner

*Primary Examiner* — Kenneth L Thompson
(74) *Attorney, Agent, or Firm* — Rosenberg, Klein & Lee

(57)                ABSTRACT
A telescopic tube device includes an outer tube, an inner tube, a mounting seat, and a resilient lock mechanism. The outer tube is formed with an alignment hole. The inner tube is formed with a plurality of adjusting holes. The mounting seat is formed with a receiving space that is in spatial communication with the alignment hole. The resilient lock mechanism includes a tube lock that is disposed in the receiving space, and an unlocking button. The tube lock includes an annular resilient member and a locking bolt. The annular resilient member has an arc section. The tube lock is movable relative to the inner tube between a locked position and an unlocked position. The arc section resiliently urges the tube lock to move toward the locked position. The unlocking button is operable to urge the tube lock to move from the locked position to the unlocked position.

10 Claims, 11 Drawing Sheets

100

10

12

13

20

50

11

TELESCOPIC TUBE DEVICE

FIELD

The present disclosure relates to a telescopic tube, and more particularly to a telescopic tube device having a resilient lock mechanism.

BACKGROUND

As shown in FIG. 1, a conventional telescopic rod (Chinese Patent Publication No. CN102748351A) includes an outer tube 1 that is formed with a plurality of positioning holes 101 which are spaced apart, an inner tube 2 that is movably inserted into the outer tube 1 and that is formed with a through hole 201, and an elastic pin 3 that is disposed in the inner tube 2. The elastic pin 3 has a spring plate portion 301 that abuts against an inner peripheral surface of the inner tube 2, and a pin portion 302 that is disposed on the spring plate portion 301. The pin portion 302 extends out of the inner tube 2 through the through hole 201, and engages one of the positioning holes 101. As such, when a user wants to adjust a length of the conventional telescopic rod, the user may use his/her finger to press the pin portion 302 inwardly so that the pin portion 302 may be moved away from the one of the positioning holes 101 as much as possible to disengage the outer tube 1 from the pin portion 302. Then, the user may pull the inner tube 2 relative to the outer tube 1 to adjust the length of the conventional telescopic rod.

The conventional telescopic rod is telescopical and adjustable in length. However, in actual use, the conventional telescopic rod has the following drawbacks.

1. During a process of disengaging the outer tube 1 by pressing the pin portion 302, the user may often get his/her finger caught by accident when the pin portion 302 resiliently bounces back.
2. To maintain engagement between the outer tube 1 and the pin portion 302, the spring plate portion 301 has to be constantly deformed to resiliently bias the pin portion 302 toward one of the positioning holes 101. As a result, the elastic pin 3 is prone to malfunction due to elastic fatigue of the spring plate portion 301.

SUMMARY

Therefore, an object of the disclosure is to provide a telescopic tube device that can alleviate at least one of the drawbacks of the prior art.

According to the disclosure, the telescopic tube device includes a telescopic tube unit and a resilient lock mechanism. The telescopic tube unit includes an outer tube that extends in an extending direction of an axis, an inner tube that is movably disposed on the outer tube and that is movable in the extending direction, and a mounting seat that is disposed on the outer tube. The outer tube is formed with an alignment hole. The inner tube is formed with a plurality of adjusting holes that are spaced apart from each other in the extending direction. One of the adjusting holes is aligned with the alignment hole. The mounting seat is formed with a receiving space that is located outside the outer tube and that is in spatial communication with the alignment hole. The resilient lock mechanism includes a tube lock that is disposed in the receiving space and that is in slidable contact with an outer peripheral surface of the outer tube, and an unlocking button that is rotatably mounted to the mounting seat and that is connected to the tube lock. The tube lock includes an annular resilient member, and a locking bolt that is disposed on the annular resilient member. The annular resilient member has two opposite free ends, and an arc section that interconnects the free ends. The locking bolt is disposed on the arc section and faces the alignment hole. The tube lock is movable relative to the inner tube between a locked position and an unlocked position. The arc section resiliently urges the tube lock to move toward the locked position. The locking bolt extends through the alignment hole and the one of the adjusting holes when the tube lock is in the locked position. The locking bolt is separated from the one of the adjusting holes when the tube lock is in the unlocked position. The unlocking button is operable to urge the tube lock to move from the locked position to the unlocked position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
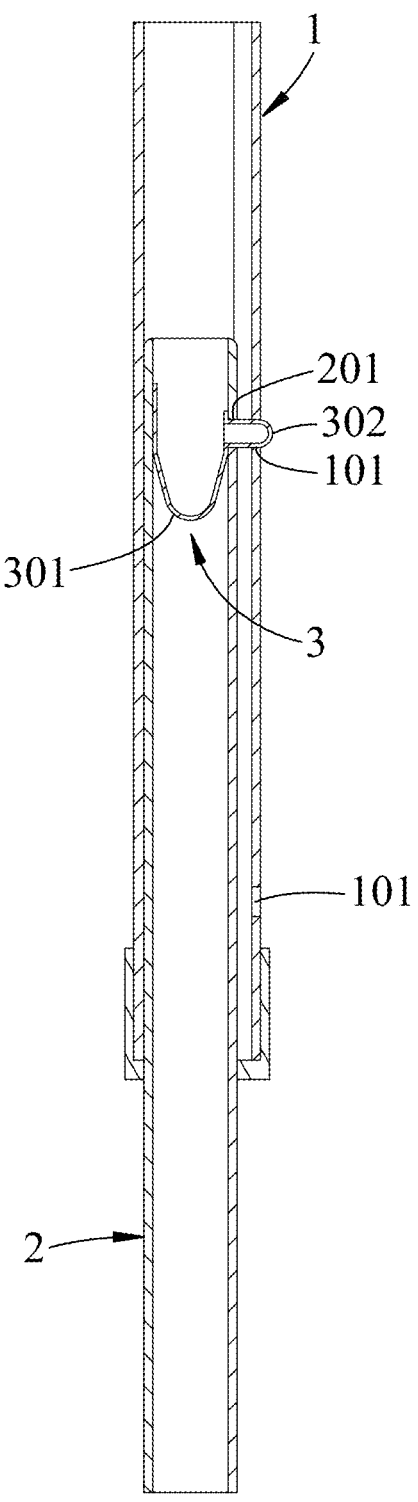
FIG. 1 is a sectional view of a conventional telescopic rod.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
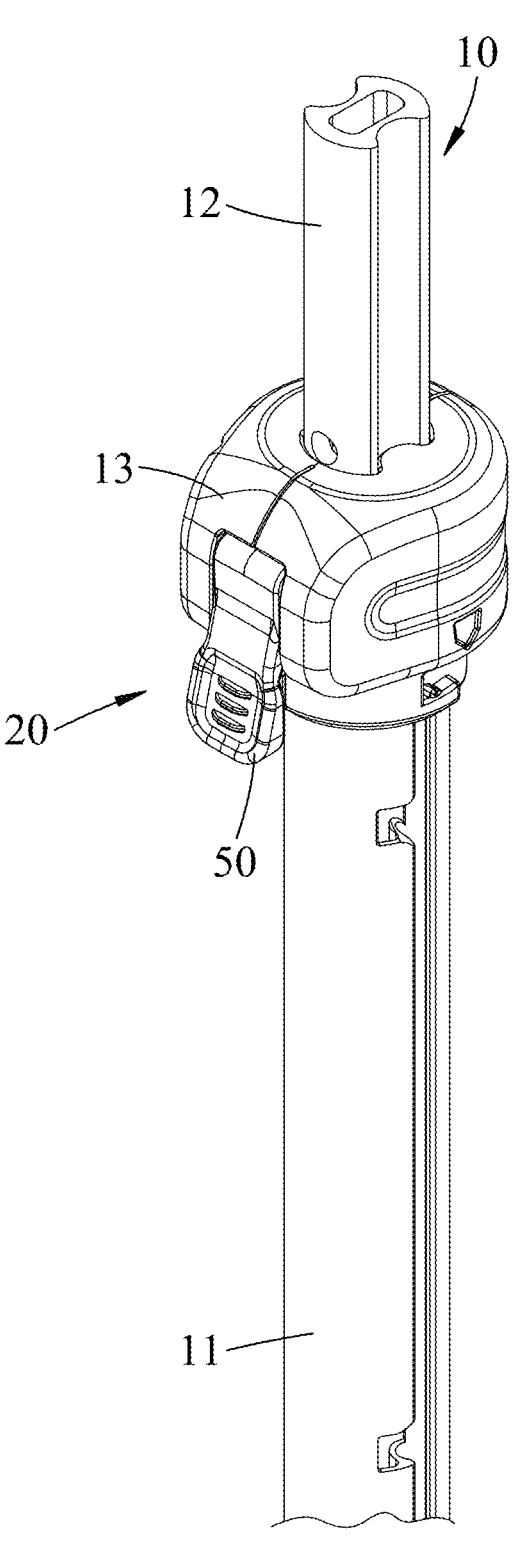
FIG. 2 is a fragmentary perspective view of an embodiment of a telescopic tube device according to the disclosure.
Figure 3:
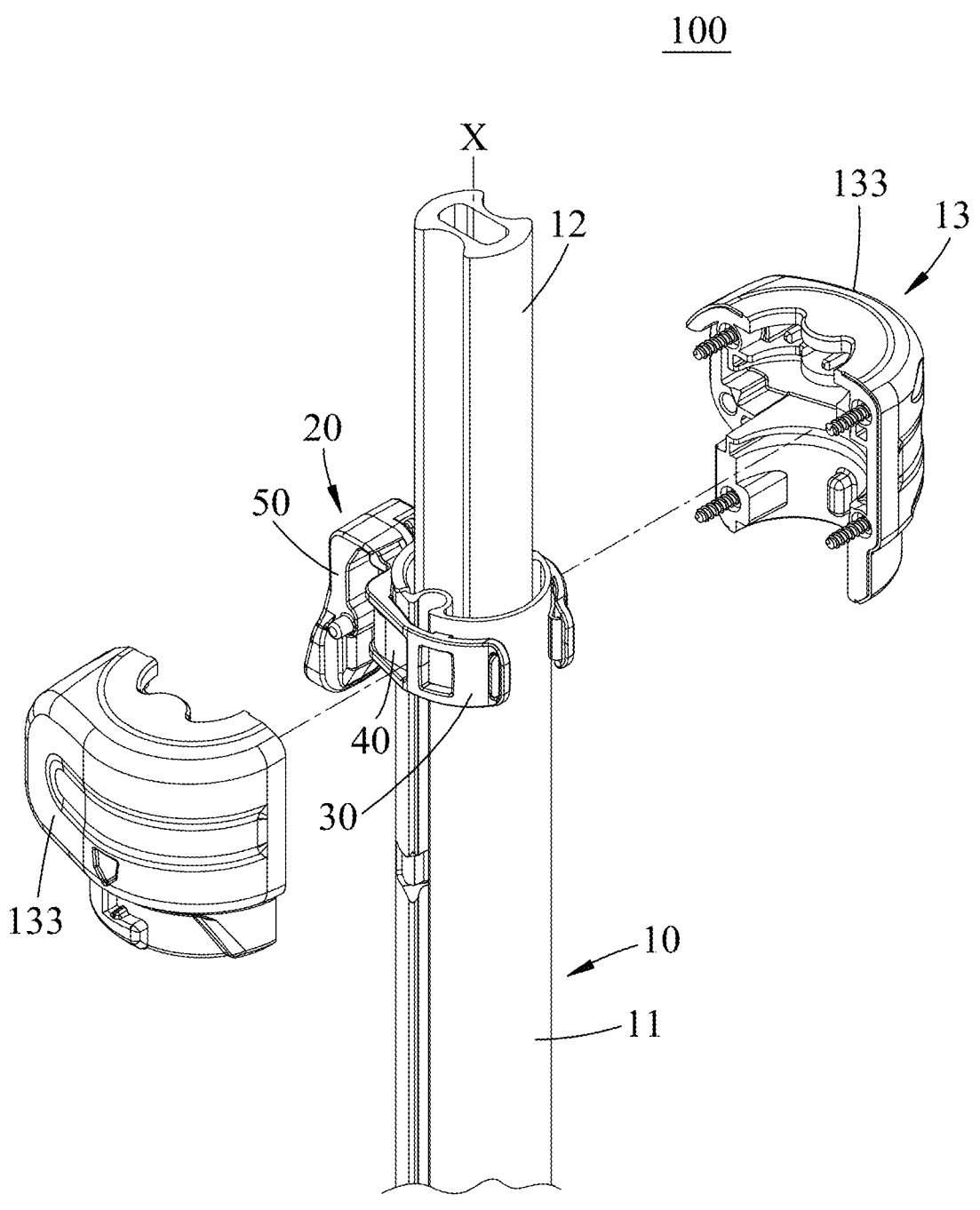
FIG. 3 is a fragmentary, partly exploded perspective view of the embodiment.
Figure 4:
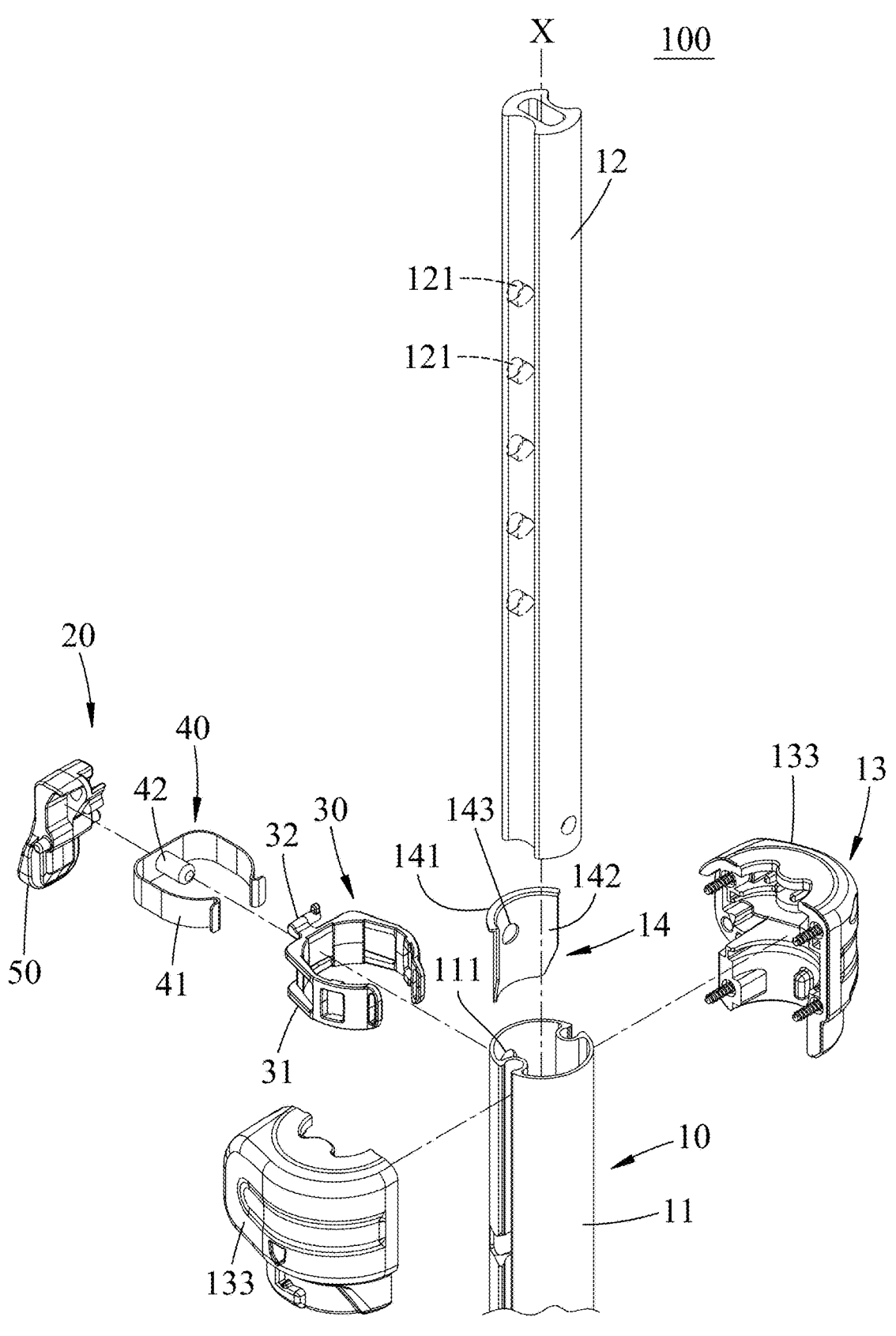
FIG. 4 is a fragmentary, exploded perspective view of the embodiment.
Figure 5:
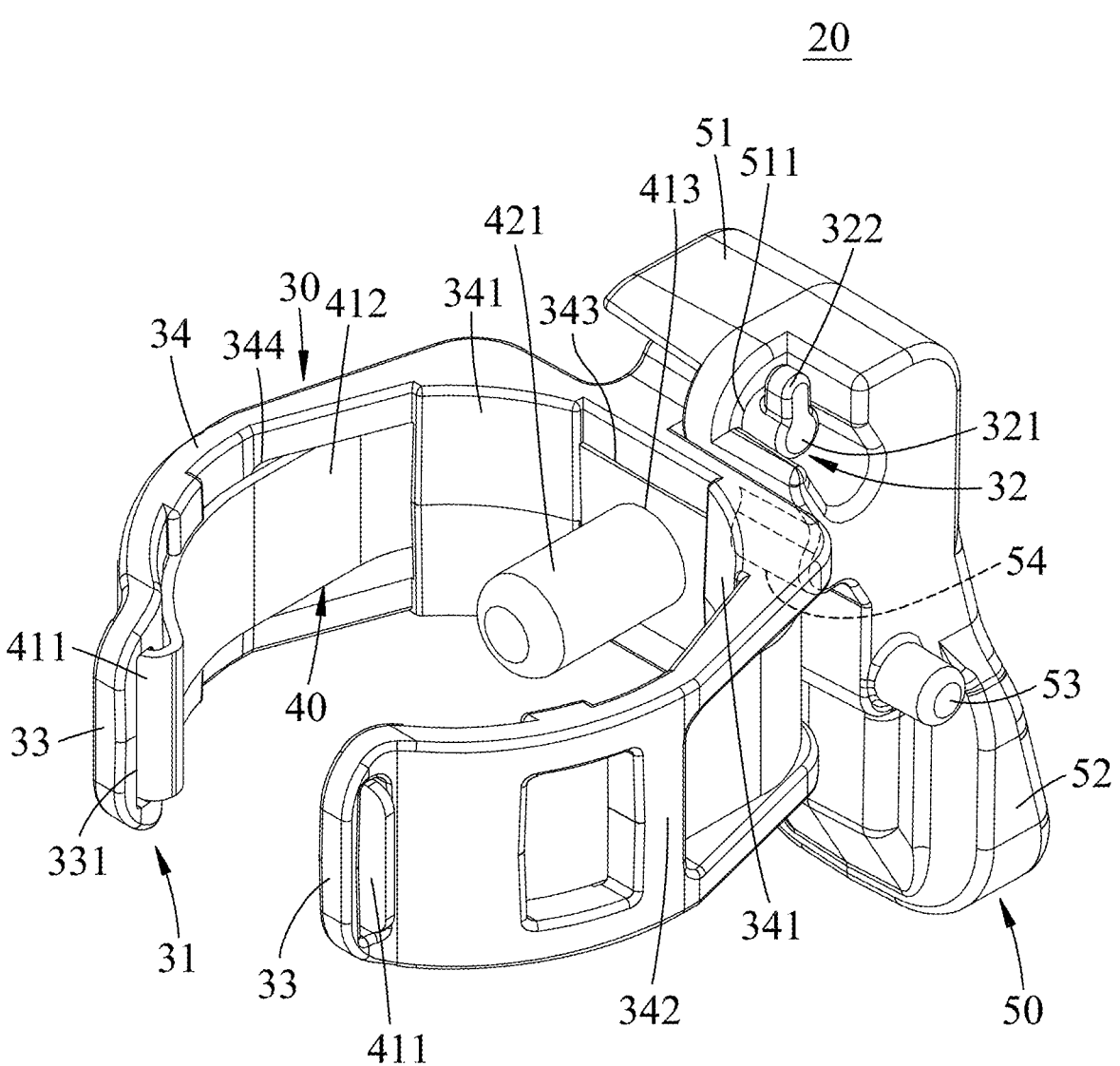
FIG. 5 is a perspective view of a resilient lock mechanism of the embodiment.

Referring to FIGS. 2, 3, and 4, an embodiment of a telescopic tube device 100 according to the present disclosure includes a telescopic tube unit 10 and a resilient lock mechanism 20.

Figure 7:
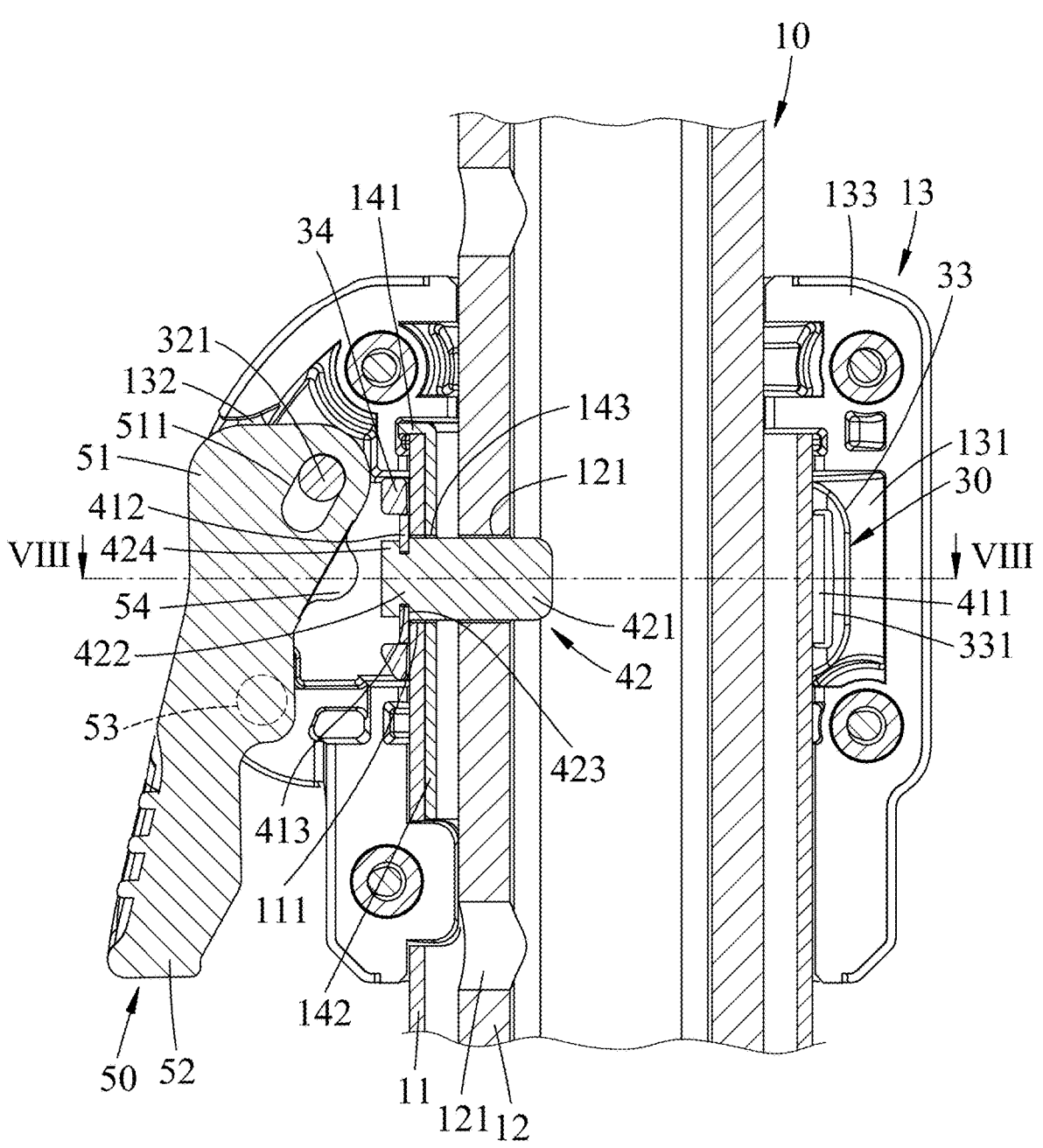
FIG. 7 is a fragmentary sectional view of the embodiment, illustrating an unlocking button of the resilient lock mechanism in a released position.
Figure 8:
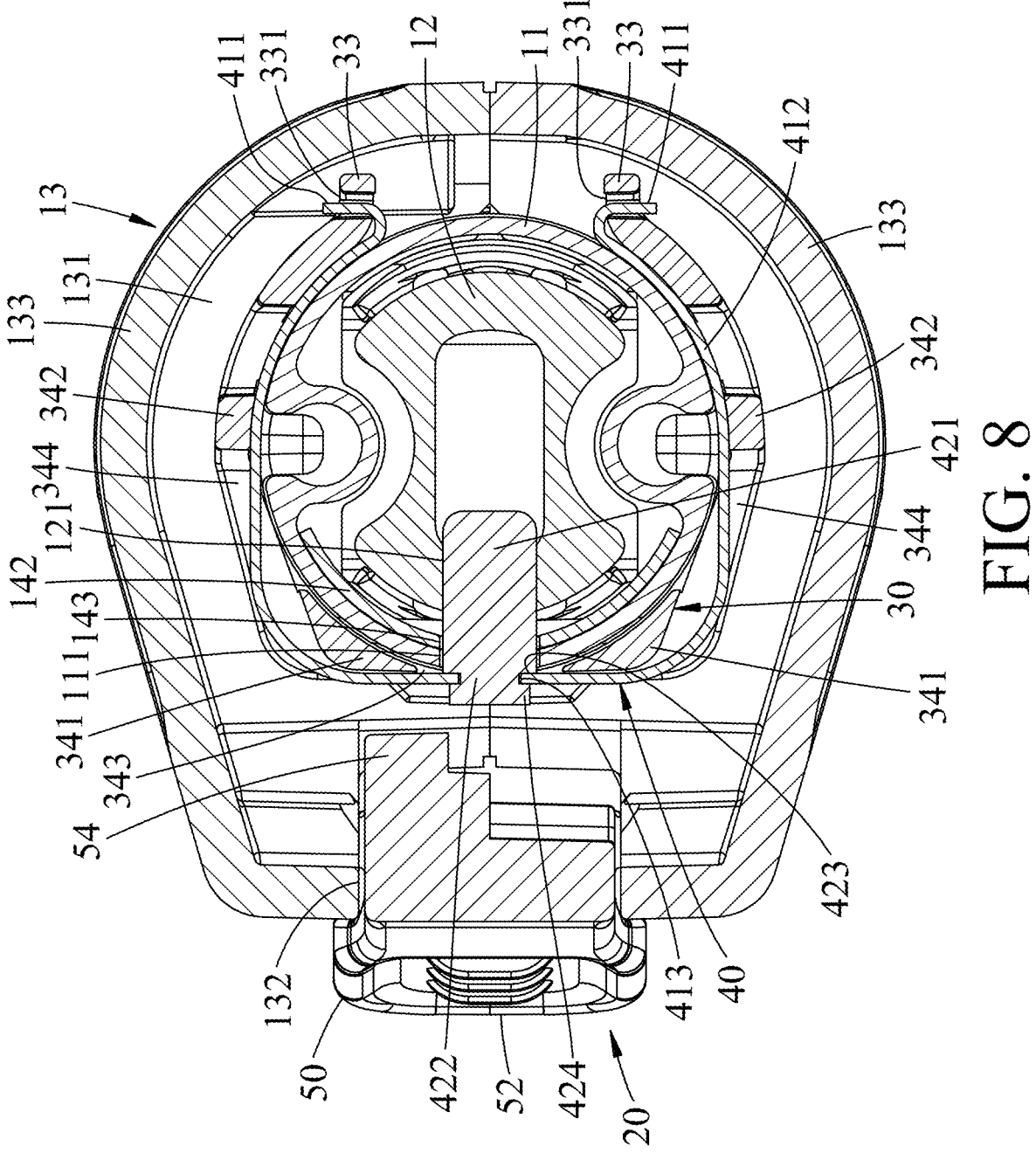
FIG. 8 is a sectional view taken along line VIII-VIII in FIG. 7, illustrating a tube lock of the resilient lock mechanism in a locked position.

As shown in FIGS. 4, 7, and 8, the telescopic tube unit 10 includes an outer tube 11 that extends in an extending direction of an axis (X), an inner tube 12 that is movably disposed on an inner side of the outer tube 11 and that is movable in the extending direction, a mounting seat 13 that is disposed on an outer side of the outer tube 11, and a reinforcement plate 14 that is disposed on the inner side the outer tube 11.

The outer tube 11 is formed with an alignment hole 111.

The inner tube 12 is formed with a plurality of adjusting holes 121 that are spaced apart from each other in the extending direction. One of the adjusting holes 121 is aligned with the alignment hole 111.

The mounting seat 13 is formed with a receiving space 131 that is located outside the outer tube 11 and that is in spatial communication with the alignment hole 111, and an operating opening 132 that is in spatial communication with the receiving space 131. In this embodiment, the mounting seat 13 is adjacent to a top end of the outer tube 11, and is positioned at the top end of the outer tube 11. The mounting seat 13 consists of two housing bodies 133 that are coupled to each other.

The reinforcement plate 14 has a shoulder wall portion 141 that abuts against the top end of the outer tube 11, and a cliff wall portion 142 that extends downwardly from the shoulder wall portion 141 and that is disposed between the outer tube 11 and the inner tube 12. The cliff wall portion 142 is formed with a communication hole 143 that is aligned with the alignment hole 111 of the outer tube 11.

As shown in FIGS. 5, 6, 7, and 8, the resilient lock mechanism 20 includes a lock pulling seat 30 that is disposed in the receiving space 131 of the mounting seat 13, a tube lock 40 that is disposed in the receiving space 131 and that is in slidable contact with an outer peripheral surface of the outer tube 11, and an unlocking button 50 that is rotatably mounted to the mounting seat 13 and that is connected to the tube lock 40.

In this embodiment, the lock pulling seat 30 includes a seat body 31, and a connecting structure 32 that is disposed on a rear end of the seat body 31.

The seat body 31 has two opposite front end portions 33, and an arc-shaped frame portion 34 that interconnects the front end portions 33. The arc-shaped frame portion 34 has two inner abutment walls 341 that are spaced apart from each other and that are located at the rear end of the seat body 31, two opposite outer abutment walls 342 each of which is disposed between a respective one of the front end portions 33 and a respective one of the inner abutment walls 341, a first through hole 343 that is between the inner abutment walls 341, and two second through holes 344 each of which is between a respective one of the inner abutment walls 341 and a respective one of the outer abutment walls 342. Each of the front end portions 33 is formed with an engaging hole 331.

The connecting structure 32 includes a pivot shaft 321, and a limiting protrusion 322 that is disposed on the pivot shaft 321 and that extends radially outward from the pivot shaft 321.

In this embodiment, the tube lock 40 is disposed on the seat body 31 of the lock pulling seat 30. The tube lock 40 includes an annular resilient member 41, and a locking bolt 42 that is disposed on the annular resilient member 41.

The annular resilient member 41 has two opposite free ends 411, and an arc section 412 that interconnects the free ends 411. The arc section 412 is formed with an assembly hole 413.

As shown in FIG. 8, when the tube lock 40 and the lock pulling seat 30 are assembled, the arc section 412 of the annular resilient member 41 extends through the second through holes 344, and abuts against outer surfaces of the inner abutment walls 341 and inner surfaces of the outer abutment walls 342. Each of the free ends 411 of the annular resilient member 41 engages the engaging hole 331 of a respective one of the front end portions 33.

Figure 6:
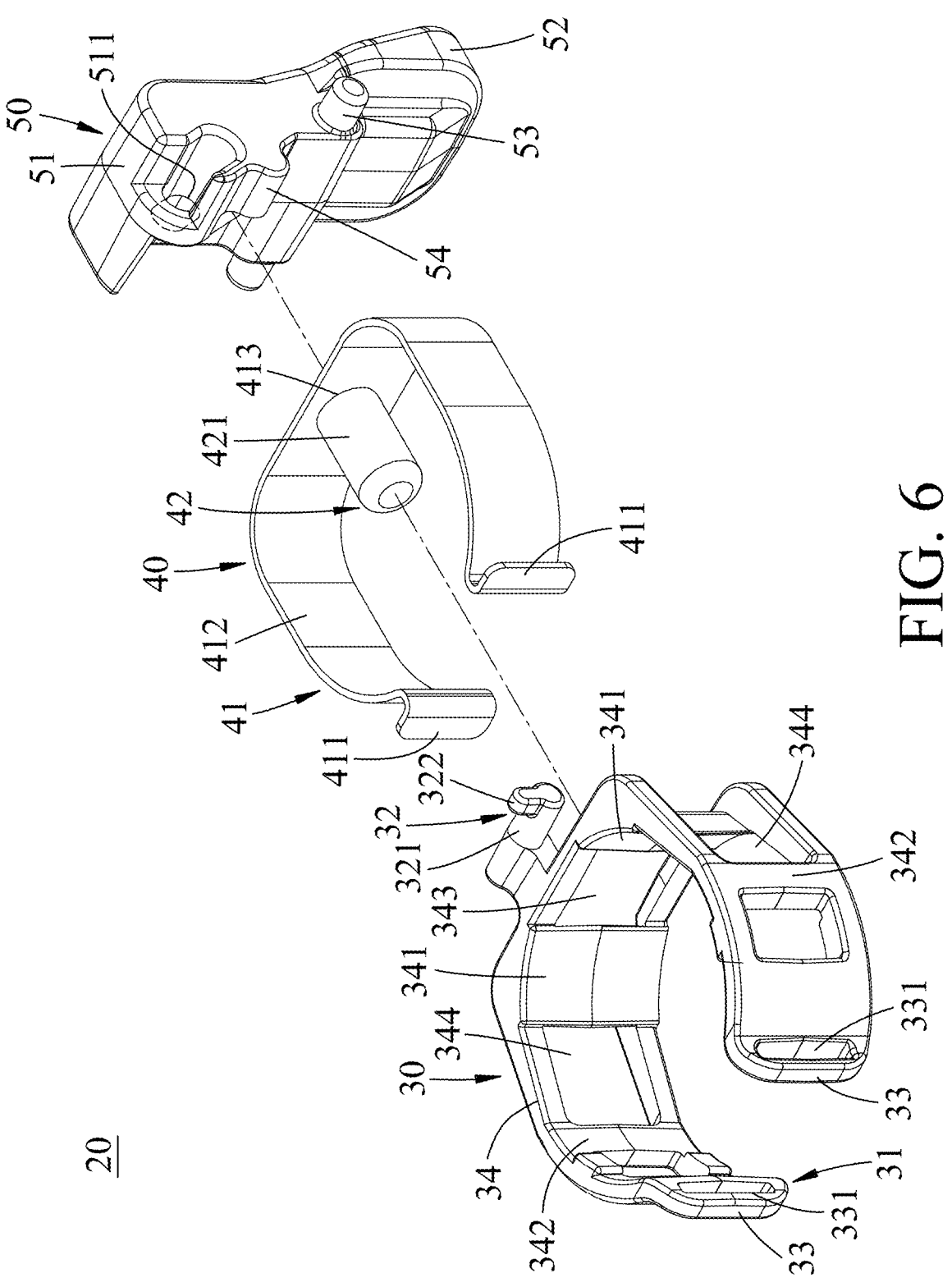
FIG. 6 is an exploded perspective view of the resilient lock mechanism.

Referring to FIGS. 6, 7, and 8, in this embodiment, the locking bolt 42 is disposed on the arc section 412, faces the alignment hole 111, and extends forwardly through the first through hole 343.

The locking bolt 42 has a large diameter portion 421 that protrudes forwardly from the assembly hole 413, a small diameter portion 422 that protrudes rearwardly from the large diameter portion 421 and that has a diameter smaller than a diameter of the large diameter portion 421, a shoulder portion 423 that is defined between the large diameter portion 421 and the small diameter portion 422, and a head portion 424 that is connected to the small diameter portion 422. The shoulder portion 423 abuts against an inner peripheral surface of the arc section 412. The small diameter portion 422 extends rearwardly through the assembly hole 413 of the arc section 412. In this embodiment, the locking bolt 42 and the annular resilient member 41 are riveted together (i.e., a rear end of the small diameter portion 422 is formed with the head portion 424 that has a diameter greater than the diameter of the small diameter portion 422).

Figure 9:
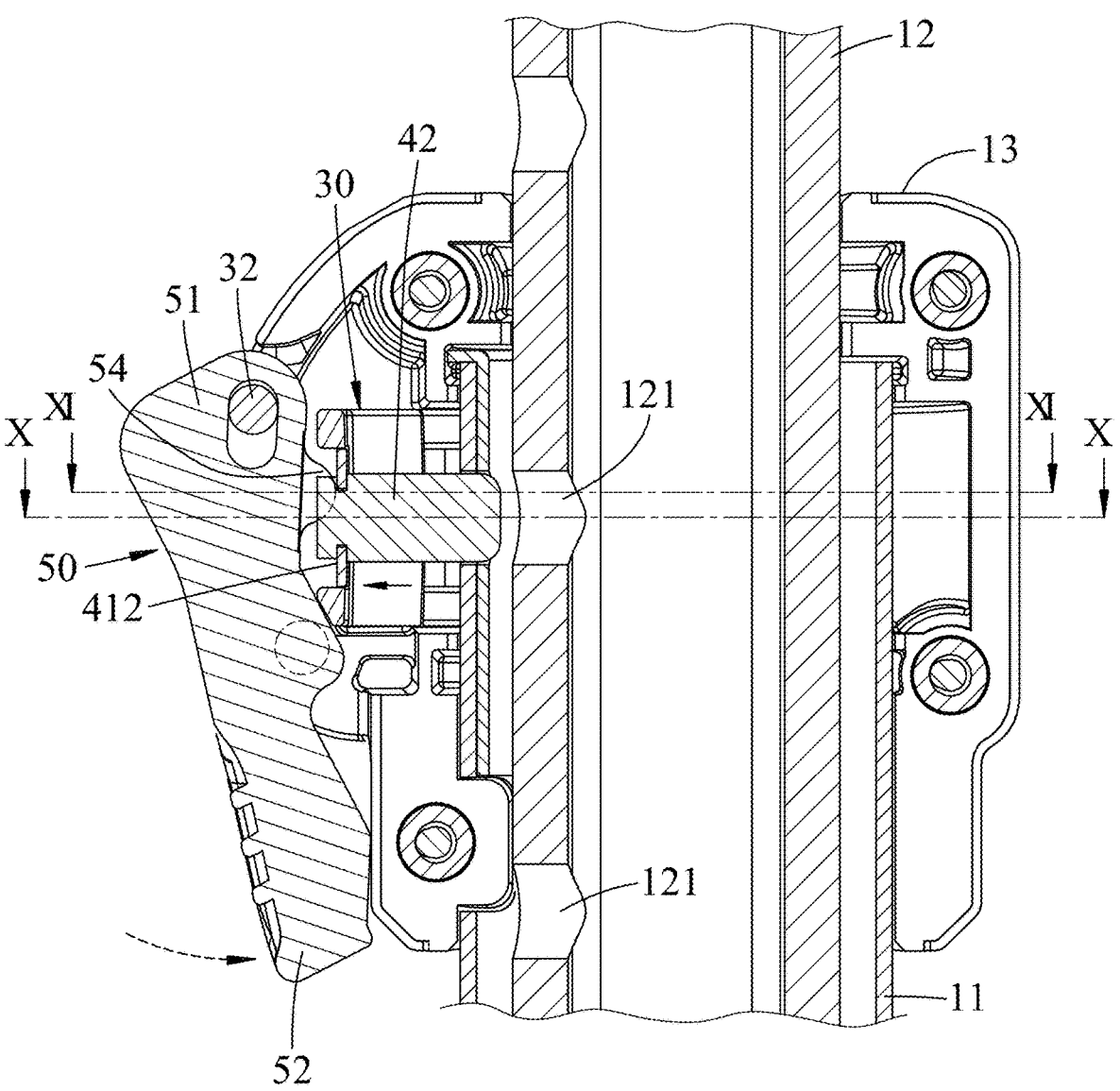
FIG. 9 is a view similar to FIG. 7, but illustrating the unlocking button in an operating position.
Figure 10:
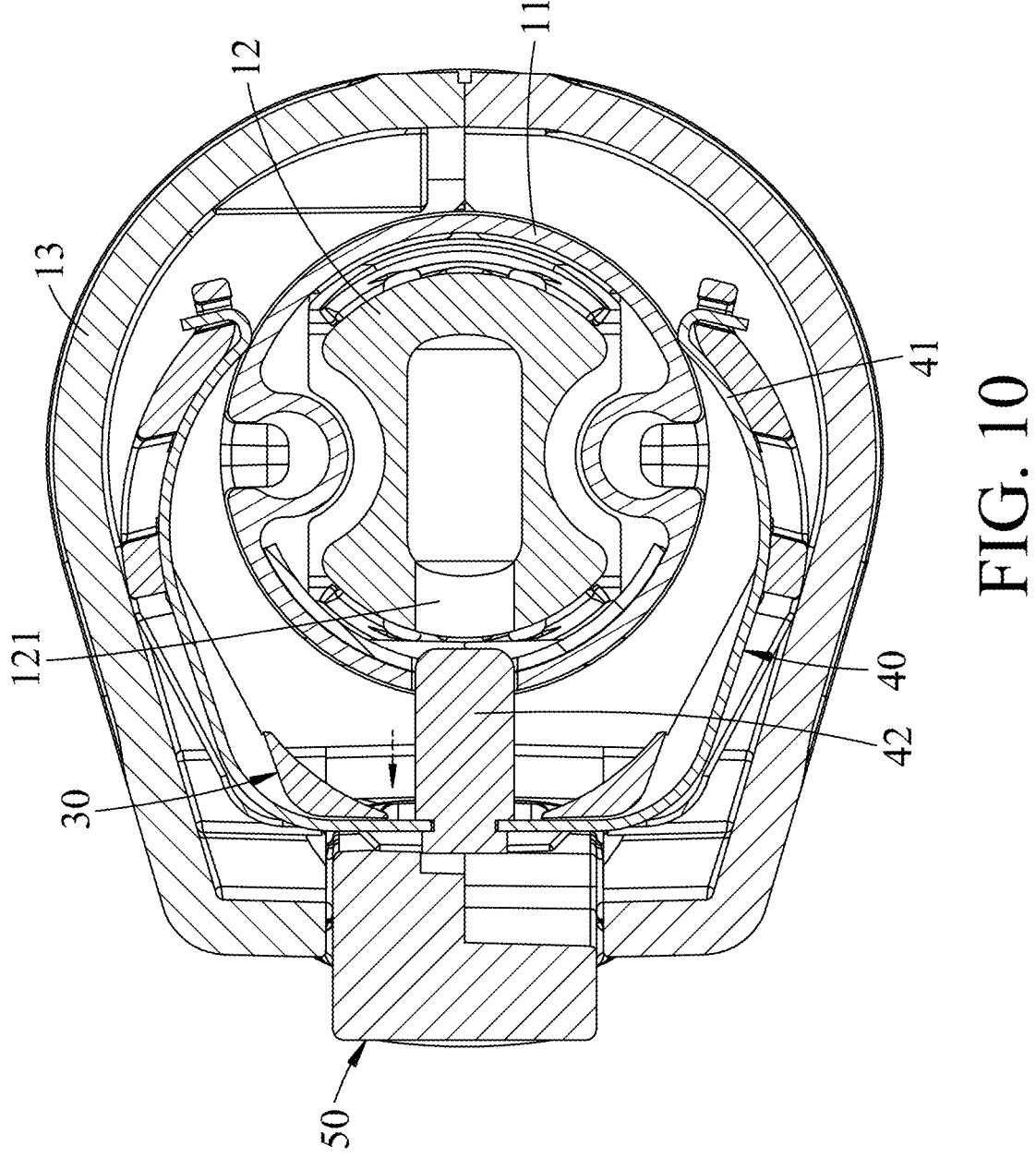
FIG. 10 is a sectional view taken along line X-X in FIG. 9, illustrating the tube lock in an unlocked position.

The tube lock 40 is movable relative to the inner tube 12 between a locked position (see FIGS. 7 and 8) and an unlocked position (see FIGS. 9 and 10). The arc section 412 resiliently urges the tube lock 40 to move toward the locked position.

As shown in FIGS. 7 and 8, when the tube lock 40 is in the locked position, the locking bolt 42 extends through the alignment hole 111, the communication hole 143, and the one of the adjusting holes 121. As shown in FIGS. 9 and 10, when the tube lock 40 is in the unlocked position, the locking bolt 42 is separated from the one of the adjusting holes 121, and at this time, the arc section 412 of the annular resilient member 41 is resiliently expanded by the outer tube 11 and stores a restoring force.

As shown in FIGS. 6, 7, and 8, the unlocking button 50 is operable to urge the tube lock 40 to move from the locked position (see FIGS. 7 and 8) to the unlocked position (see FIGS. 9 and 10). In this embodiment, the unlocking button 50 is connected to the lock pulling seat 30, and the tube lock 40 is disposed on the lock pulling seat 30. Therefore, the unlocking button 50 is operable to urge the tube lock 40 to move from the locked position (see FIGS. 7 and 8) to the unlocked position (see FIGS. 9 and 10) via the lock pulling seat 30.

The unlocking button 50 has a connecting portion 51 that is connected to the connecting structure 32 of the lock pulling seat 30, a press portion 52 that is opposite to the connecting portion 51, a rotating portion 53 that is between the connecting portion 51 and the press portion 52 and that is rotatably connected to the mounting seat 13, and a stop portion 54 that is disposed between the connecting portion 51 and the rotating portion 53 and that protrudes toward the arc section 412 of the annular resilient member 41.

The connecting portion 51 extends into the receiving space 131 through the operating opening 132, and is formed with an oblong hole 511. The pivot shaft 321 of the connecting structure 32 of the lock pulling seat 30 engages the oblong hole 511. In this embodiment, the limiting protrusion 322 protrudes out of the oblong hole 511. When the unlocking button 50 and the lock pulling seat 30 are assembled, the limiting protrusion 322 of the connecting structure 32 prevents the unlocking button 50 and the lock pulling seat 30 from separation.

The stop portion 54 of the unlocking button 50 is misaligned with the head portion 424 and the small diameter portion 422 of the locking bolt 42.

The unlocking button 50 is swingable relative to the mounting seat 13 between a released position (see FIGS. 7 and 8) and an operating position (see FIGS. 9 and 10).

As shown in FIGS. 7 and 8, when the unlocking button 50 is in the released position, the press portion 52 is distal from the mounting seat 13, and, at this time, the tube lock 40 is in the locked position and the stop portion 54 is separated from the arc section 412 of the annular resilient member 41.

Figure 11:
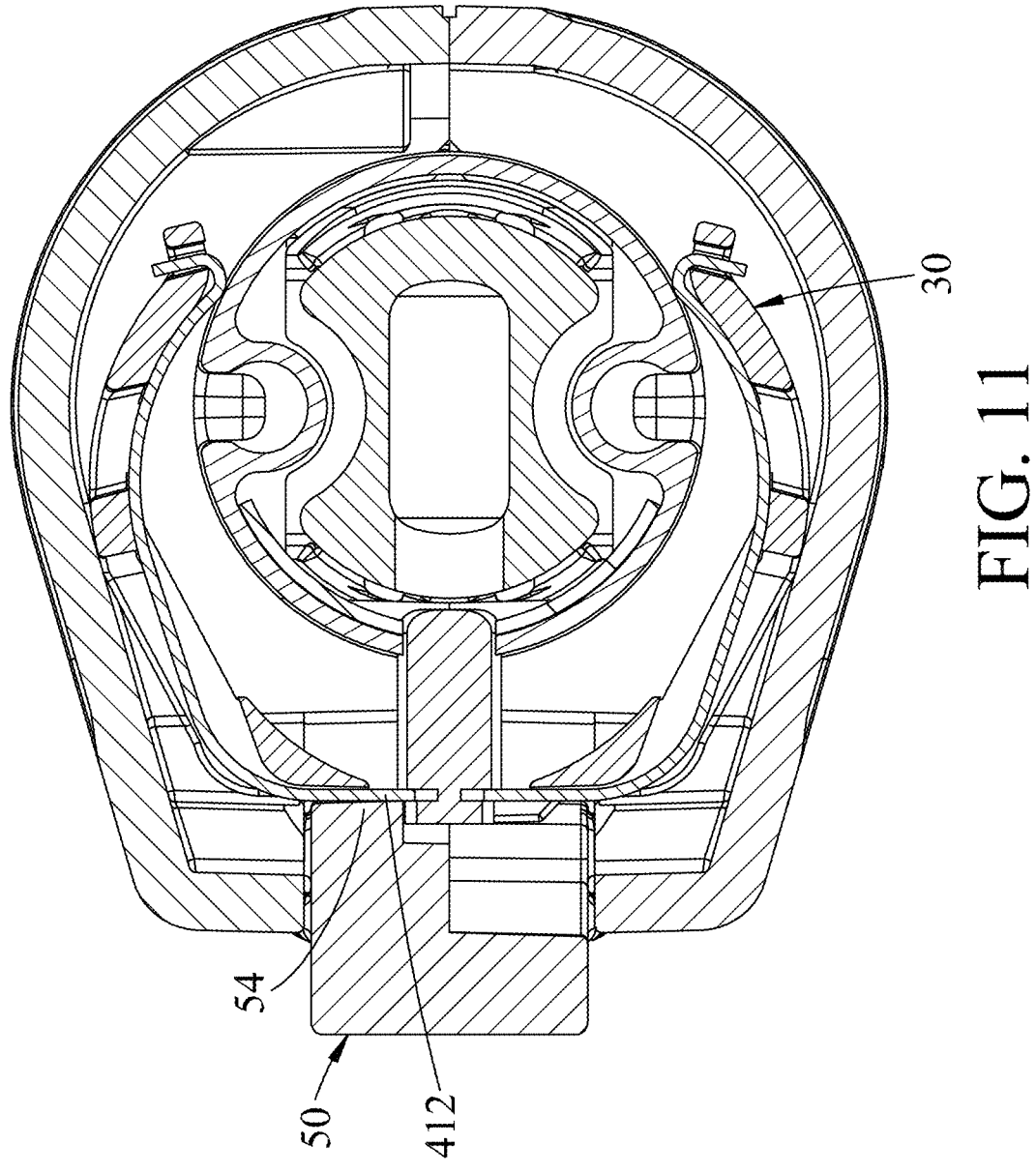
FIG. 11 is a sectional view taken along line XI-XI in FIG. 9, illustrating a stop portion of the unlocking button abutting against an annular resilient member of the tube lock.

As shown in FIGS. 9 and 10, when the unlocking button 50 is in the operating position, the press portion 52 is proximate to the mounting seat 13, and the tube lock 40 is in the unlocked position. It should be understood that, when the unlocking button 50 swings from the released position to the operating position, the connecting portion 51 pulls the lock pulling seat 30 outwardly from the outer tube 11 through the connecting structure 32 of the lock pulling seat 30 such that the tube lock 40 to is urged to move outwardly from the outer tube 11 to the unlocked position. Moreover, as shown in FIG. 11, when the unlocking button 50 is in the operating position, the stop portion 54 abuts against the arc section 412 of the annular resilient member 41 to prevent the annular resilient member 41 from moving relative to the lock pulling seat 30.

Therefore, as shown in FIGS. 9 and 10, when a user wants to adjust a length of the telescopic tube unit 10, the user may press the press portion 52 of the unlocking button 50 to urge the unlocking button 50 to swing to the operating position, thereby urging the tube lock 40 to move to the unlocked position via the lock pulling seat 30. Consequently, the locking bolt 42 of the tube lock 40 is separated from the one of the adjusting holes 121 to unlock the inner tube 12. As such, the user may pull or push the inner tube 12 relative to the outer tube 11 to adjust the length of the telescopic tube unit 10. Afterwards, referring to FIGS. 7 and 8, because the arc section 412 of the tube lock 40 is resiliently expanded by the outer tube 11, when the user releases the press portion 52 of the unlocking button 50, the arc section 412 of the tube lock 40 resiliently urges the tube lock 40 together with the lock pulling seat 30 to return to the locked position via the restoring force so that the locking bolt 42 of the tube lock 40 may extend through another one of the adjusting holes 121 of the inner tube 12, thereby locking the inner tube 12. At this time, the unlocking button 50 is urged by the lock pulling seat 30 to return to the released position.

Through the above description, advantages of the present disclosure are summarized below.

1. Because the tube lock 40 is urged to move to the unlocked position by operation of the unlocking button 50, the user's finger is not in touch with the tube lock 40 when the user releases the tube lock 40 from the inner tube 12 to unlock the inner tube 12. Compared with the prior art, the present disclosure effectively prevents the user from accidentally getting his/her finger caught by the tube lock 40.

2. The annular resilient member 41 of the tube lock 40 is resiliently expanded by the outer tube 11 only when the tube lock 40 is moved to the unlocked position (i.e., only when the inner tube 12 is unlocked). The tube lock 40 is merely coupled to the outer tube 11 and is not resiliently deformed by the outer tube 11 when the tube lock 40 is in the locked position (i.e., when the inner tube 12 is locked). Compared with the prior art, the annular resilient member 41 of the tube lock 40 is not constantly deformed so that elastic fatigue of the annular resilient member 41 does not occur easily, thereby preventing the locking bolt 42 from malfunction due to the elastic fatigue of the annular resilient member 41.

3. When the tube lock 40 is in the locked position and locks the inner tube 12, the annular resilient member 41 of the tube lock 40 is directly coupled to the outer tube 11. As a result, even when the mounting seat 13, the lock pulling seat 30, and the unlocking button 50 are damaged due to accidental impact, aging, or other factors, the annular resilient member 41 of the tube lock 40 may still be coupled to the outer tube 11. The tube lock 40 may still remain in the locked position and may not fall from the outer tube 11, thereby preventing the tube lock 40 from malfunction.

4. By virtue of the stop portion 54 of the unlocking button 50 abutting against the arc section 412 of the annular resilient member 41 when the unlocking button 50 is in the operating position, the annular resilient member 41 is prevented from being misaligned with the lock pulling seat 30 when the annular resilient member 41 is urged to move relative to the outer tube 11. Thus, the annular resilient member 41 may be kept in a correct position relative to the lock pulling seat 30.

In summary, the telescopic tube device 100 according to the present disclosure may prevent the user's finger from being accidentally caught. Furthermore, the tube lock 40 is not prone to malfunction that is caused by the elastic fatigue of the annular resilient member 41. Therefore, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features.

In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A telescopic tube device comprising:
a telescopic tube unit including an outer tube that extends in an extending direction of an axis, an inner tube that is movably disposed on the outer tube and that is movable in the extending direction, and a mounting seat that is disposed on the outer tube, the outer tube being formed with an alignment hole, the inner tube being formed with a plurality of adjusting holes that are spaced apart from each other in the extending direction, one of the adjusting holes being aligned with the alignment hole, the mounting seat being formed with a receiving space that is located outside the outer tube and that is in spatial communication with the alignment hole; and a resilient lock mechanism including a tube lock that is disposed in the receiving space and that is in slidable contact with an outer peripheral surface of the outer tube, and an unlocking button that is rotatably mounted to the mounting seat and that is connected to the tube lock, the tube lock including an annular resilient member and a locking bolt that is disposed on the annular resilient member, the annular resilient member having two opposite free ends and an arc section that interconnects the free ends, the locking bolt being disposed on the arc section and facing the alignment hole, the tube lock being movable relative to the inner tube between a locked position and an unlocked position, the arc section resiliently urging the tube lock to move toward the locked position, the locking bolt extending through the alignment hole and the one of the adjusting holes when the tube lock is in the locked position, the locking bolt being separated from the one of the adjusting holes when the tube lock is in the unlocked position, the unlocking button being operable to urge the tube lock to move from the locked position to the unlocked position.

2. The telescopic tube device as claimed in claim 1, wherein the resilient lock mechanism further includes a lock pulling seat that is disposed in the receiving space of the mounting seat, the tube lock being disposed on the lock pulling seat, the unlocking button being connected to the lock pulling seat, the unlocking button urging the tube lock to move from the locked position to the unlocked position via the lock pulling seat.

3. The telescopic tube device as claimed in claim 2, wherein the lock pulling seat includes a seat body, the seat body having two opposite front end portions and an arc-shaped frame portion that interconnects the front end portions, the arc-shaped frame portion having two inner abutment walls that are spaced apart from each other and that are located at a rear end of the seat body, two opposite outer abutment walls each of which is disposed between a respective one of the front end portions and a respective one of the inner abutment walls, a first through hole that is between the inner abutment walls, and two second through holes each of which is between a respective one of the inner abutment walls and a respective one of the outer abutment walls, each of the front end portions being formed with an engaging hole, the arc section of the annular resilient member extending through the second through holes and abutting against outer surfaces of the inner abutment walls and inner surfaces of the outer abutment walls, each of the free ends of the annular resilient member engaging the engaging hole of a respective one of the front end portions, the locking bolt extending forwardly through the first through hole.

4. The telescopic tube device as claimed in claim 2, wherein the lock pulling seat includes a seat body, and a connecting structure that is disposed on a rear end of the seat body, the tube lock being disposed on the seat body, the unlocking button having a connecting portion that is connected to the connecting structure of the lock pulling seat, a press portion that is opposite to the connecting portion, and a rotating portion that is between the connecting portion and the press portion and that is rotatably connected to the mounting seat, the unlocking button being swingable relative to the mounting seat between a released position and an operating position, wherein the press portion is distal from the mounting seat and the tube lock is in the locked position when the unlocking button is in the released position, and wherein the press portion is proximate to the mounting seat and the tube lock is in the unlocked position when the unlocking button is in the operating position.

5. The telescopic tube device as claimed in claim 4, wherein the connecting structure of the lock pulling seat includes a pivot shaft, the connecting portion of the unlocking button being formed with an oblong hole, the pivot shaft engaging the oblong hole.

6. The telescopic tube device as claimed in claim 5, wherein the connecting structure of the lock pulling seat further includes a limiting protrusion that is disposed on the pivot shaft, that protrudes out of the oblong hole, and that extends radially outward from the pivot shaft.

7. The telescopic tube device as claimed in claim 4, wherein the unlocking button further has a stop portion that is disposed between the connecting portion and the rotating portion and that protrudes toward the arc section of the annular resilient member, the stop portion being separated from the arc section of the annular resilient member when the unlocking button is in the released position, the stop portion abutting against the arc section of the annular resilient member when the unlocking button is in the operating position.

8. The telescopic tube device as claimed in claim 7, wherein the arc section of the annular resilient member is formed with an assembly hole, the locking bolt having a large diameter portion that protrudes forwardly from the assembly hole, a small diameter portion that protrudes rearwardly from the large diameter portion and that has a diameter smaller than a diameter of the large diameter portion, and a shoulder portion that is defined between the large diameter portion and the small diameter portion, the shoulder portion abutting against an inner peripheral surface of the arc section, the small diameter portion extending through the assembly hole of the arc section, the stop portion of the unlocking button being misaligned with the small diameter portion.

9. The telescopic tube device as claimed in claim 4, wherein the mounting seat is further formed with an operating opening that is in spatial communication with the receiving space, the connecting portion of the unlocking button extending into the receiving space through the operating opening.

10. The telescopic tube device as claimed in claim 1, wherein the telescopic tube unit further includes a reinforcement plate that is disposed on the outer tube, the mounting seat being adjacent to a top end of the outer tube, the reinforcement plate having a shoulder wall portion that abuts against the top end of the outer tube, and a cliff wall portion that extends downwardly from the shoulder wall portion and that is disposed between the outer tube and the inner tube, the cliff wall portion being formed with a communication hole that is aligned with the alignment hole of the outer tube, the locking bolt extending through the alignment hole, the communication hole, and the one of the adjusting holes when the tube lock is in the locked position.

* * * * *